C. A. HULTQUIST.
ROCK DRILL CHUCK.
APPLICATION FILED AUG. 12, 1916.
1,210,321.
Patented Dec. 26, 1916.
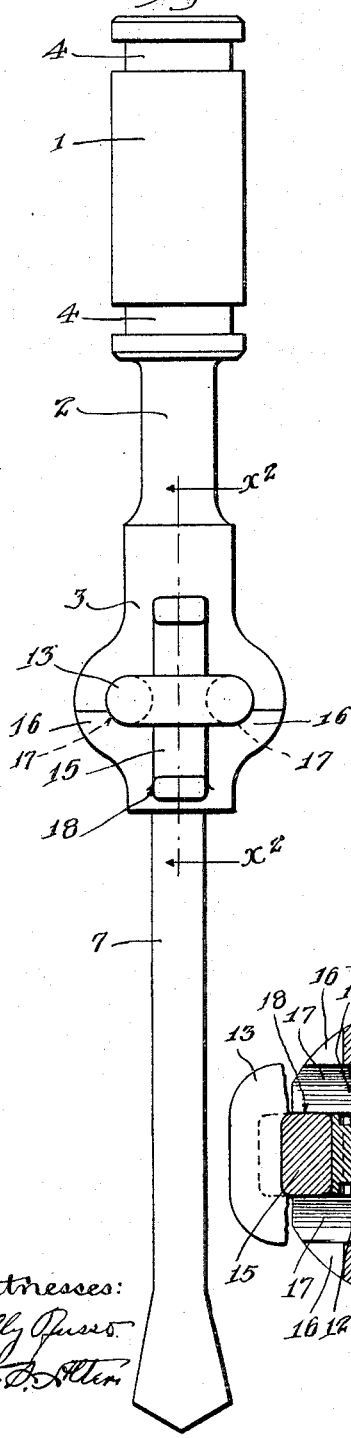
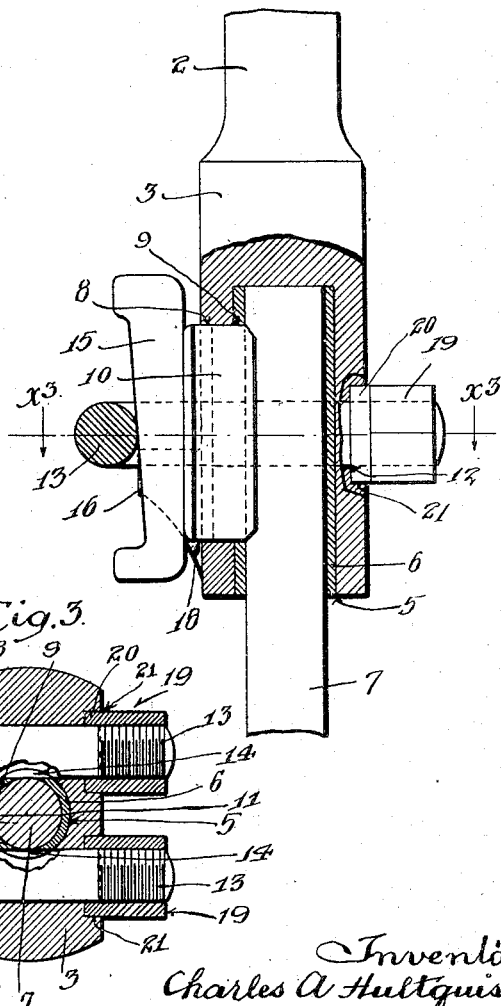
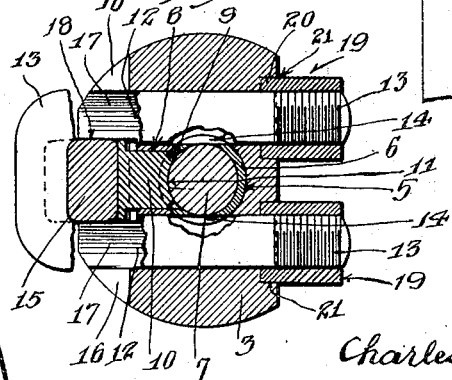
Witnesses:
Inventor
Charles A. Hultquist
By Frederick Ryan Atty.

UNITED STATES PATENT OFFICE.

CHARLES A. HULTQUIST, OF LOS ANGELES, CALIFORNIA.

ROCK-DRILL CHUCK.

1,210,321.        Specification of Letters Patent.        Patented Dec. 26, 1916.

Application filed August 12, 1916. Serial No. 114,561.

*To all whom it may concern:*

Be it known that I, CHARLES A. HULTQUIST, a citizen of the United States, residing at Los Angeles, in the county of Los Angeles and State of California, have invented a new and useful Rock-Drill Chuck, of which the following is a specification.

This invention relates to devices of the character designed to hold a tool such as a drill-bit or the like, and an object of the invention is to provide a construction in which the fastening parts will be maintained in perfect condition so that they can be used over and over again without repairing thereof and so that the drill-bit will be held with maximum security.

Another object is to make provision in this class of devices employing a key, wedge and U-bolt construction for preventing the U-bolt from being bent when the wedge is driven in.

Ordinarily in this class of devices having the U-bolt fastening, the intermediate portion of the U-bolt is spaced apart from the key to receive the wedge, and said intermediate portion together with the adjacent portions of the legs of the U-bolt project a considerable distance out of the holes in which the U-bolt is accommodated, so that, when the wedge is driven in, the intermediate portion and adjacent portions of the legs of the U-bolt are forcibly bent in the direction in which the wedge is driven in. This makes it advisable to straighten the U-bolt before it is used the next time, and it is readily seen that such straightening consumes time and is also more or less detrimental to the strength of the U-bolt. When the U-bolt bends the wedge cannot be as tightly driven in place as when the U-bolt is prevented from bending.

Another object is to make provision for the prevention of bending of the U-bolt by a simple and efficient construction.

The accompanying drawings illustrate the invention.

Figure 1 is a side elevation of a device embodying the invention, the drill-bit being shown in place. Fig. 2 is an enlarged fragmentary view mainly in section on line indicated by $x^2$—$x^2$, Fig. 1. Fig. 3 is a transverse section on line indicated by $x^3$—$x^3$, Fig. 2, a portion of the U-bolt being broken away for clearness of illustration.

There is provided a chuck member comprising a head 1, intermediate shank 2 and socket member 3, said head being provided with annular grooves 4 for retention of the device in an operating tool, not shown, such, for instance, as a pneumatically operated drilling engine. The socket member 3 is provided with a socket 5 and in said socket is seated a bushing 6 adapted to receive the end of a drill-bit 7 or other tool.

The socket member 3 and bushing 6 are provided with key slots 8, 9 respectively to accommodate a key 10 having a curved seat 11 to engage the periphery of the drill-bit 7. The key 10, as is well understood, prevents longitudinal and rotative movements of the drill-bit 7 relative to the socket member so that when the device is in use the tool will be securely held in the socket member.

On both sides of the key slot 8 the socket member 3 is provided with bolt holes 12 to accommodate the leg portions of a U-bolt 13, said bolt holes communicating at their inner sides with the socket 5, and the bushing 6 being provided with notches 14 adapted to be engaged by the U-bolt when the bushing and U-bolt are in place. Thus the U-bolt assists in preventing the bushing 6 from being withdrawn from the socket 5.

Inserted between the key 10 and the intermediate portion of the U-bolt 13 is a wedge 15 contacting the outer face of the key 10 so as to hold said key firmly in place.

The socket member 3 is provided on both sides of the wedge 15 and key 10 with abutments in the form of lugs 16 of somewhat greater height than the thickness of the wedge 15, said lugs having curved faces 17 forming seats to engage the leg portions of the U-bolt adjacent the intermediate portion of said U-bolt. The lugs 17 thus form a channel 18 therebetween to accommodate the wedge 15. The purpose of the lugs 17 is to prevent the U-bolt from being bent when the wedge 15 is being driven in place to hold the key against the drill-bit 7 for, without said lugs, the U-bolt would tend to be bent at the face of the socket member 3 where the intermediate portion of the U-bolt projects from the bolt holes 12.

The U-bolt 13 is provided with the usual nuts 19 which have cylindrical portions 20 to engage counterbores 21.

In practice, to remove the drill-bit 7 from the device, the wedge 15 will be knocked loose to relieve the pressure on the key 10 so as to free the drill-bit. In inserting the drill bit in the socket member, said drill-bit will be pushed into the bushing 6 and then the wedge 15 will be driven tightly into place between the key 10 and the intermediate portion of the U-bolt. During the driving in of the wedge 15 the lugs 16 function to prevent the U-bolt from being bent so that the wedge can be driven much tighter than if the U-bolt were allowed to bend with it when it is being driven.

Thus it is clear, that the device, though comparatively simple, is very useful in insuring that the drill-bit 7 be tightly held in the socket member and that the U-bolt be maintained in good condition for that purpose.

I claim:

1. In combination, a socket member having a key slot, a tool in the socket member, a key in the slot engaging the tool, lugs on the socket member at both sides of the key, a U-bolt passing through the socket member and seated against the lugs, and a wedge between the key and intermediate portion of the U-bolt.

2. In combination, a socket member having a channel, a tool in the socket member, a key to hold said tool in place, a U-bolt projecting from the socket member astride of said channel, the material forming the sides of the channel engaging and preventing bending of the U-bolt and a wedge accommodated in said channel between the key and U-bolt.

3. In combination, a socket member, a tool in the socket member, a U-bolt projecting from the socket member, means including a wedge retained by the U-bolt to hold the tool in place, and means to prevent bending of the U-bolt when the wedge is being driven in.

Signed at Los Angeles, California, this 7th day of August, 1916.

CHARLES A. HULTQUIST.

Witnesses:
GEORGE H. HILES,
ANNA F. SCHMIDTBAUER.

Copies of this patent may be obtained for five cents each, by addressing the "Commissioner of Patents, Washington, D. C."